Dec. 22, 1970     C. V. KENT     3,550,076
COLOR ZONE SYSTEM OF TRAFFIC SPEED VERIFICATION
Filed Jan. 26, 1967     4 Sheets-Sheet 1
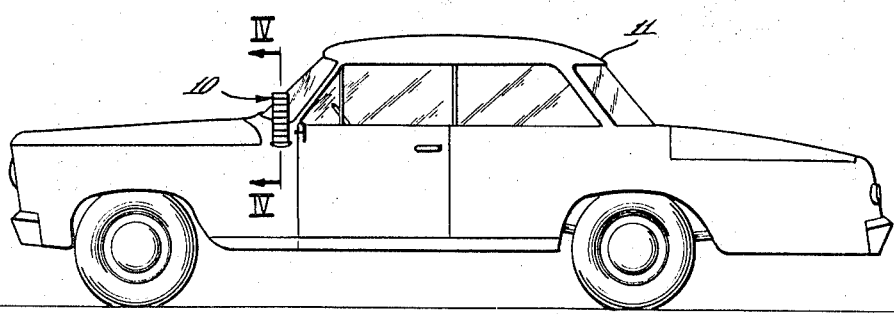
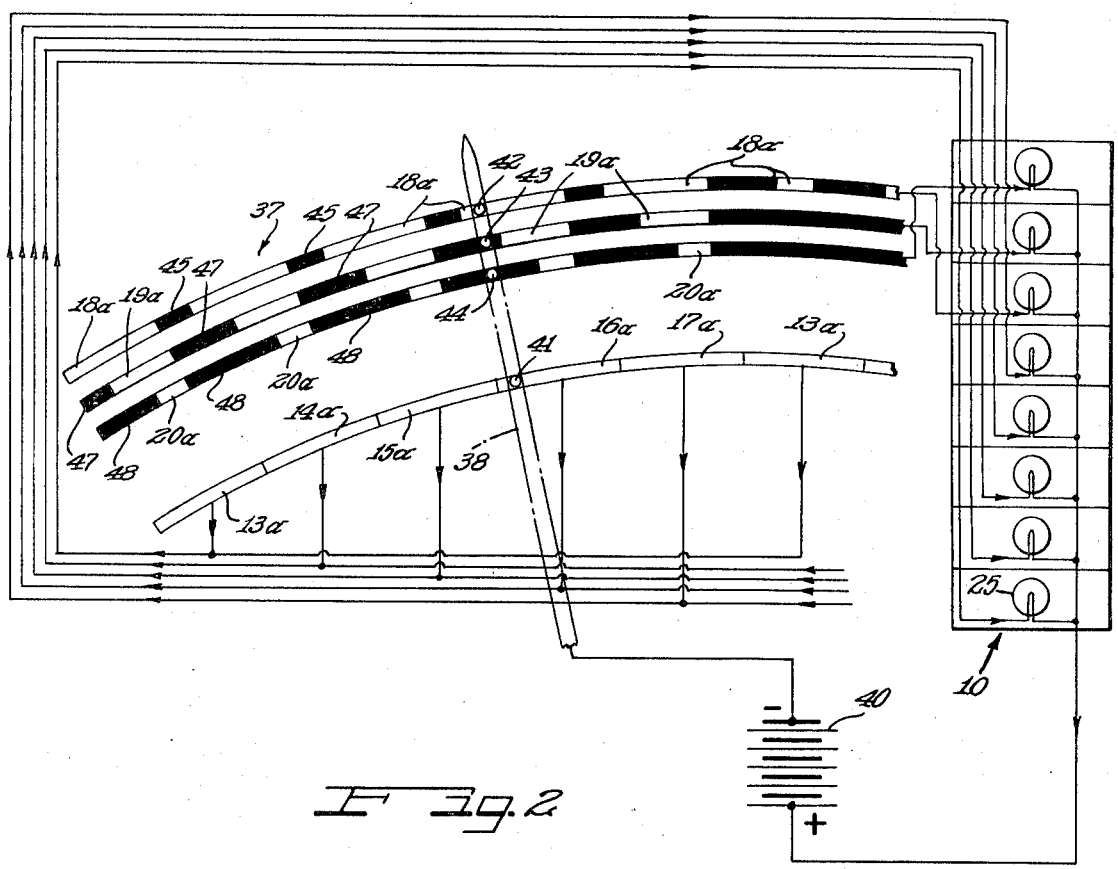
INVENTOR.
*Cornelius Varden Kent*
BY   ATTORNEYS Dec. 22, 1970     C. V. KENT     3,550,076
COLOR ZONE SYSTEM OF TRAFFIC SPEED VERIFICATION
Filed Jan. 26, 1967     4 Sheets-Sheet 2
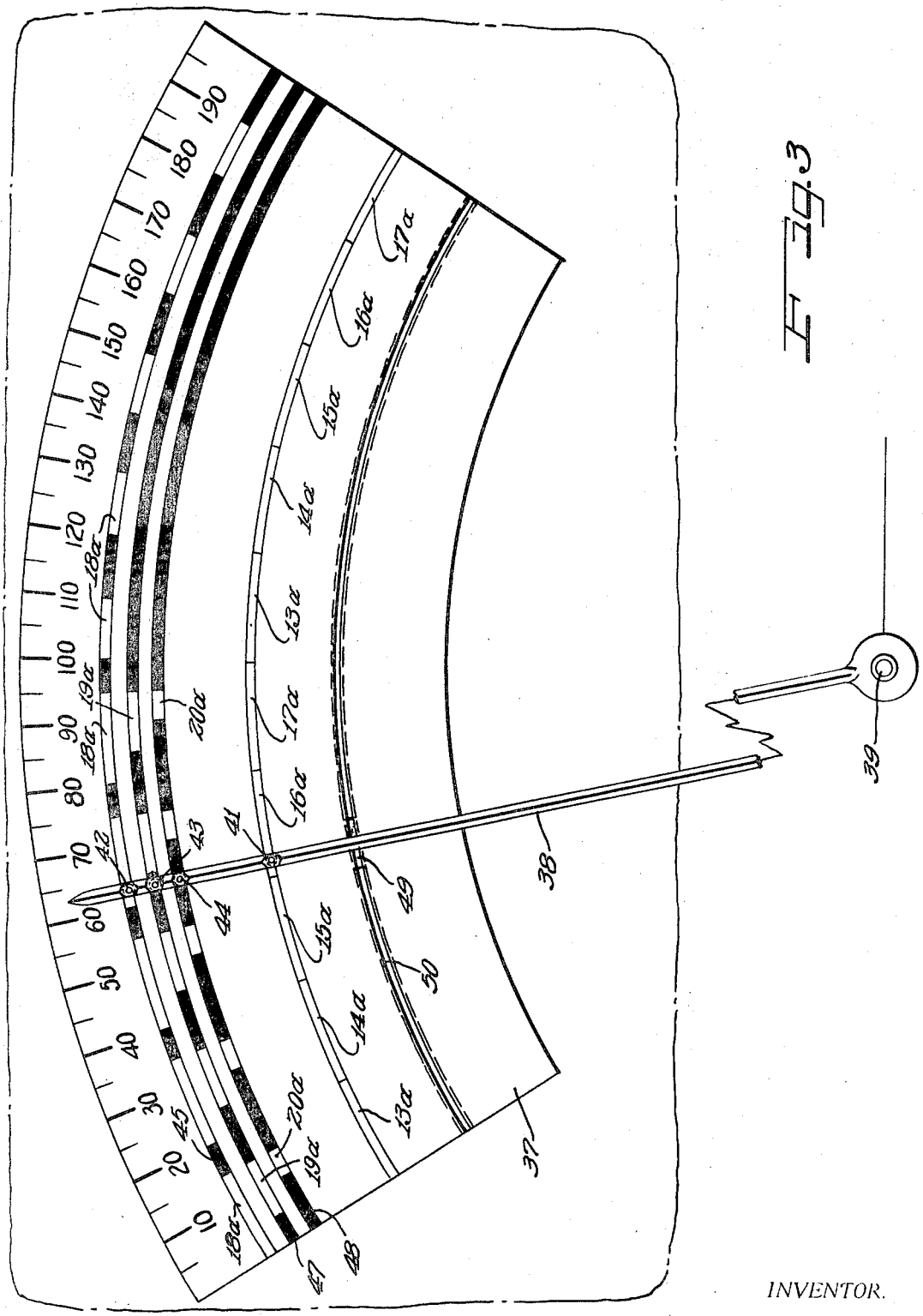
INVENTOR.
Cornelius Varden Kent
BY
ATTORNEYS

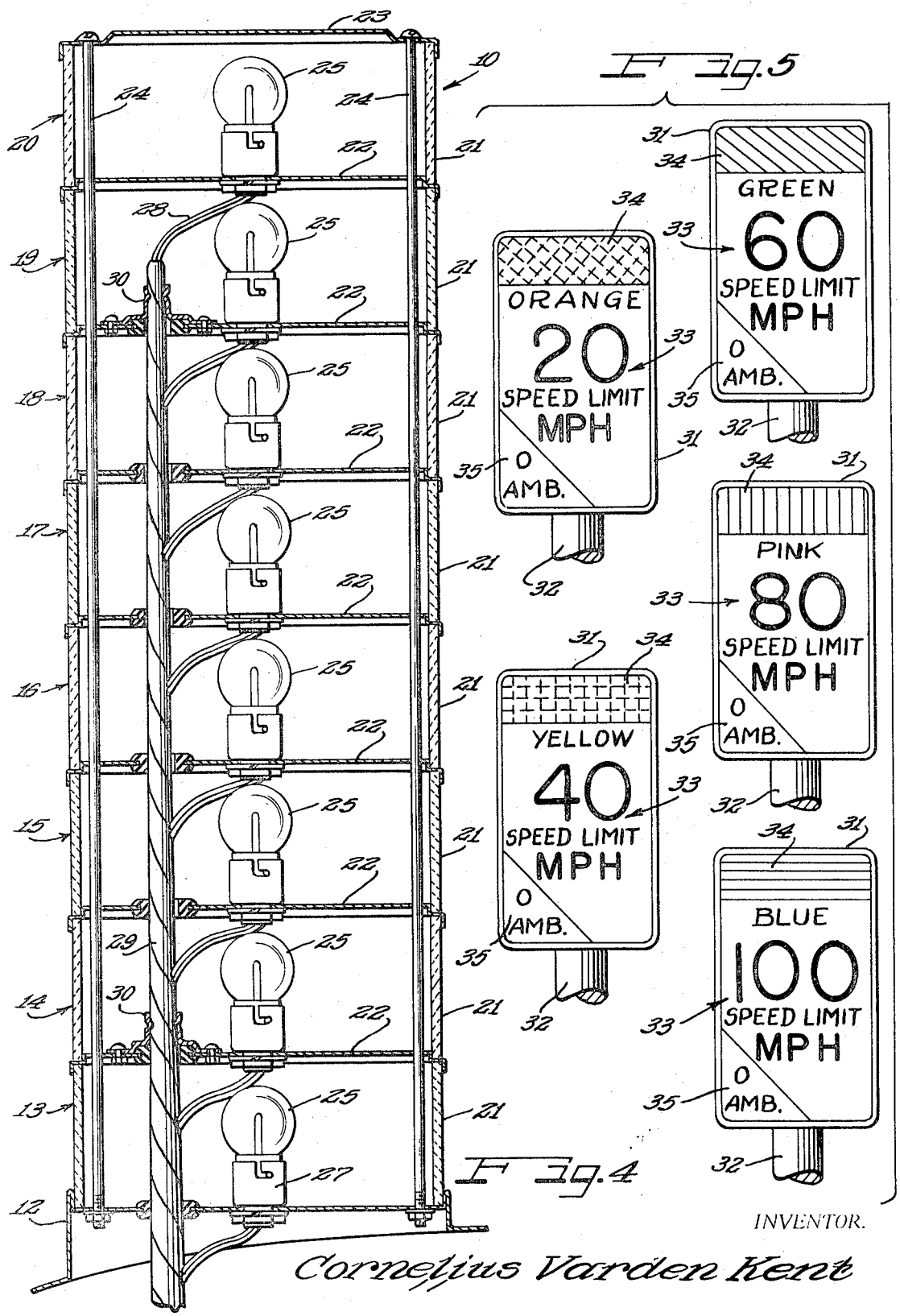

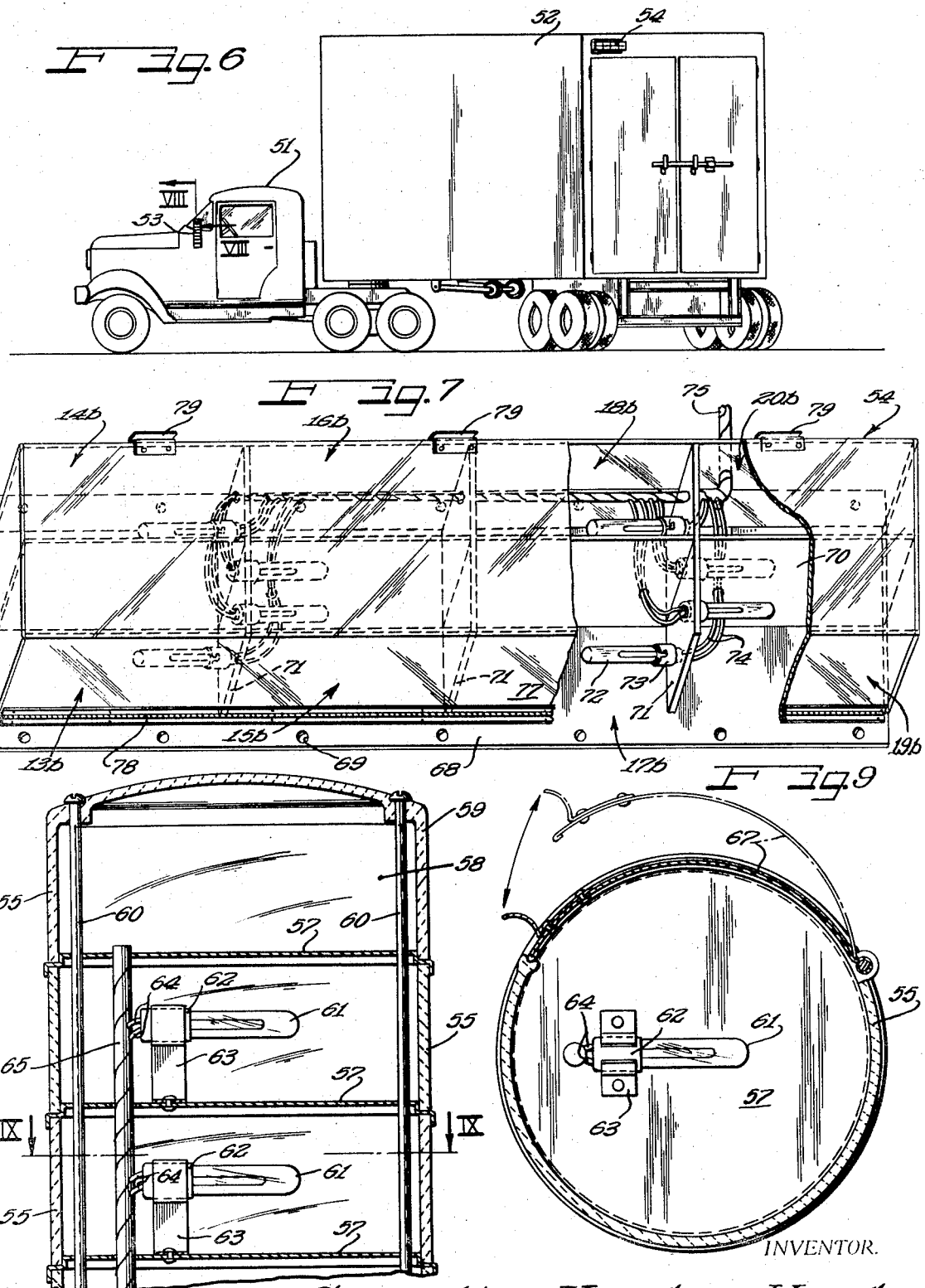

United States Patent Office 3,550,076
Patented Dec. 22, 1970

3,550,076
COLOR ZONE SYSTEM OF TRAFFIC SPEED VERIFICATION
Cornelius Varden Kent, Hinsdale, Ill., assignor to Ruth L. Kent, Hinsdale, Ill.
Filed Jan. 26, 1967, Ser. No. 611,973
Int. Cl. B60q 1/00
U.S. Cl. 340—22         7 Claims

ABSTRACT OF THE DISCLOSURE

A traffic speed verifying system in which each vehicle is equipped with a device providing speed-synchronized color signals to be visually compared by the vehicle driver and the general public within sight of the vehicle with color coded speed zone markers along the road.

---

This invention relates, in general, to the art of traffic regulation, and is more particularly concerned with a novel method and means for verifying the speed of travel of a vehicle in relation to posted speed limits along a road.

The right to regulate the speed at which vehicles may travel along roads resides in the political body having general jurisdiction over the area through which the road runs or for which the particular political body has provided the funds. For example, the federal government exercises control over Federal highways, the respective states over state highways, counties over country roads, and municipalities over the streets within their sole jurisdiction. Posting of speed limits along at least the principally travelled roads (a term used herein to designate any vehicular roadway, within any jurisdiction) has become virtually universal. There is even substantial uniformity in respect to the type of speed marker, namely, generally rectangular, and most often vertically elongated marker panels having thereon the requisite miles per hour speed limit sign.

However, enforcement of the speed limits varies greatly from place to place, being strict in some places and lax in other places, involving the investment of large sums in radar and electronic checking devices, airplane and motor patrol equipment, and requiring large numbers of law enforcement personnel devoting all or the major portion of their activities in partolling traffic.

Nevertheless, the yearly statistics show an ever-rising number of traffic deaths and injuries, and excessive speed, and more particularly exceeding the speed limits determined as practicable for any particular stretch of road, has been indicated as the principal single cause of the frightful carnage.

Most vehicle drivers conscientiously endeavor to stay within posted speed limits. Some studies have shown that about 85% of drivers fall within this category. It is the remaining 15% who create the principal hazard, endangering not only themselves but innocent victims from among the larger group of conscientious drivers.

A major problem in determining whether a vehicle is exceeding a particular speed limit resides in that the speedometers of vehicles are solely readable by the vehicle occupant. Even if the speedometers were mounted to be visible by persons outside of the vehicles, dimensional practicalities require that the speedometer dial be of such small size as to make them readable only by persons in relatively close proximity. As a result, speed limit violation is customarily determined by a pacing vehicle or some sort of speed-gauging apparatus such as radar. None of these expedients affords a sufficient scope of coverage to provide anything more than minimum deterrent value, and actually encourage some less principled drivers to take chances when they think they are free from surveillance.

It is, accordingly, an important object of the present invention to provide a novel traffic speec verifying system which will substantially freely expose to everyone within reasonable viewing distance of a travelling vehicle whether or not the vehicle is maintaining the posted speed limit.

Another object of the invention is to provide a novel traffic speed verifying system utilizing a color coated correlation between speed posting markers along a road and a device mounted on a road travelling vehicle.

Yet another object of the invention is to provide a novel device mounted on a road travelling vehicle and within view of observers inside or outside of the vehicle and operatively connected with speed responsive means of the vehicle for providing speed-synchronized color signals which are comparable with color coded speed zone markers along the road for directly determining whether the vehicle is travelling within the speed limit designated by the markers.

A still further object of the invention is to provide means which will automatically and irrefutably expose to view the relative speed at which a road vehicle is travelling, for comparison with speed limit markers so that everyone within viewing distance can monitor any violations of the posted speed limit.

Other objects, features and advantages of the present invention will be readily apparent from the following detailed description of certain preferred embodiments thereof, taken in conjunction with the accompanying drawings, in which:

FIG. 1 is a side elevational view of an automobile, representative of road running vehicles generally, equipped with a speed synchronized visual signalling device according to the principles of the present invention;

FIG. 2 is an electrical diagram demonstrating speed synchronization of the color signalling device of the system with the speedometer of the vehicle;

FIG. 3 is a schematic plan view of a speedometer arrangement suitable for practicing the present invention;

FIG. 4 is an enlarged vertical sectional detail view of the vehicle-mounted color signalling device, taken substantially on the lines IV—IV of FIG. 1;

FIG. 5 shows representative speed limit road markers for use in the system of the present invention;

FIG. 6 is an elevational view of a tractor trailer truck equipped with speed signalling means according to the present invention;

FIG. 7 is an enlarged isometric view of a speed signalling device of the kind provided for mounting on the rear of a truck trailer;

FIG. 8 is an enlarged fragmentary vertical sectional detail view taken substantially on line VIII—VIII of FIG. 6; and FIG. 9 is a transverse sectional detail view taken substantially on line IX—IX of FIG. 8.

In a traffic speed verifying system according to the principles of the present invention, a device, conveniently in the form of a tower 10 for providing speed-synchronized color signals, is constructed and arranged to be mounted on a vehicle 11 (FIG. 1) in such a position as to be readily observable by most, if not all, persons within reasonable viewing distance. While an automobile has been chosen as representative of road vehicles, as a class, it will be appreciated that the invention is applicable to every type of road vehicle, and more particularly automotive vehicles, including, without limitation, automobiles, motorcycles, trucks, truck and other tractors, etc. A desirable position for the color signal tower 10 on an automobile is immediately forwardly adjacent to the position of the customary rearview mirror on the driver's side of the vehicle. There it may be viewed by the driver, but does not interfere with the driver's clear driving vision. The tower should be of sufficient height for the intended purpose but not excessively large, and suggested dimensions are about six inches in diameter and about eighteen inches in height. Uniform traffic code regulations may be prescribed to control the position and dimensions of the device for each type of vehicle, if desired.

In one form, the signal tower 10 may comprise a base 12 suitably shaped for convenient attachment to the part of the vehicle on which the tower is mounted. Carried by the base 12 is a suitable stacked series of color compartments, herein comprising eight in number, identified from bottom to top as 13, 14, 15, 16, 17, 18, 19 and 20. Each compartment comprises a translucent tubular wall or body portion 21 observable from all sides, with the body portion 21 of the lowermost compartment seated on the base member 12 and each of the upwardly successive compartments having a base plate 22 seated on the subjacent tubular body 21. On the uppermost tubular body 21 is seated a closure cap 23, and the entire assembly is suitably secured together, as by means of tie bolts 24 extending between the cap 23 and the base 12.

By having the base 12, the horizontal divider partitions 22 and the cover 23 opaque, illuminating means comprising a respective electrical lamp bulb 25 in each of the sections 13 to 20 is adapted to light any selected section individually without interference from the light in any companion section, but more importantly assures that the illumination in any particular section will be clearly apparent and identifiable. Means for interchangeably receiving the respective lamps 25 comprise sockets 27 suitably mounted within each of the respective tower sections, and in the illustrated instance mounted on the base 12 and the separating partitions 22, as the case may be. Connection of the lamp sockets to a power source is through respective leads 28 emanating from a cable or bundle 29 extending upwardly through the tower and attached to supporting clips 30 at suitable intervals along its length mounted on respective ones of the separator partitions 22.

For constant traffic speed verification, speed limit markers are located at intervals along the vehicle travelled roads according to standard practice but having thereon respective color signs according to a color code designating the speed limit for the associated strip of road. While these markers may be of any preferred type suitable for the type of road and traffic control of any particular type or stretch of road, overhead or roadside, for illustrative purposes roadside panel-type markers 31 mounted on suitable supporting posts 32 are depicted in FIG. 5. Each of the markers 31 has thereon a speed limit sign 33 desirably including a numeral which indicates the top speed for its section of road. In addition to the numerical speed limit signs, each of the different speed limit markers has thereon a color panel 34, preferably on its upper portion, according to a predetermined color code. This panel may be accompanied by the name of the color where preferred, as shown. The speed color zones cover a range of twenty mile-per-hour increments so that for each one hundred miles of speed zoning, five different color zone identification signs are provided. Thus, the first 5 to 20 m.p.h. markers carry the color orange; the above 20 to 40 m.p.h. markers carry yellow; the above 40 to 60 m.p.h. markers carry green; the above 60 to 80 m.p.h. markers carry pink; and the above 80 to 100 m.p.h. markers carry blue.

Within any given speed limit range, it may be desirable to have sections of road posted at a lesser speed for any of a variety of traffic control conditions, such as at intersections, school zones, shopping areas, residential areas, curves, merging roads, and the like. To this end, although FIG. 5 shows only the top limit marker for each color zone increment, markers for lesser or fractional speed limits by suitable gradations will be understood, as for example, by five m.p.h. gradations. In addition means are provided in the color code for differentiating the lesser or fractional limits within the twenty m.p.h. speed zone increments. Accordingly, the sign face of each of the markers 31 is provided with an area 35 of the same color for every sign but distinguishable from all of the other colors adopted to identify the various speed zone parameters. In addition, each of the areas 35 is desirably of a different shape from the panels 34, in this instance being shown as comprising a generally triangular panel area located conveniently in one of the lower corner portions of the marker panel. In contrast to the principal color panels 34, amber has been selected as the color for the panel areas 35. Within each of the panel areas 35, means are provided for indicating the fractional or whole gradation of the particular twenty-mile speed zone increment of the color code. Conveniently this comprises four different identifications to indicate respective five-mile gradations. Thus, for the first five miles within any twenty-mile color zone increment, the numeral "1" may appear in the panel area 35; for the five-ten mile gradation, the numeral "2" may appear therein; for the third five-mile gradation the numeral "3" may appear therein and for the fourth gradation which, of course, reaches the whole number of the increment, the numeral "0" may appear. In addition, if preferred, the indicia may include the word or abbreviation for "amber," although this may be omitted. The numerical speed limit sign will most generally have the fractional gradation number of miles-per-hour thereon, as well.

For traffic speed verification, the several separated translucent sections of the tower 10 are respectively equipped to provide various colors matching the speed limit marker colors, both in respect to the speed zone colors and the fractional subdivisions identified with the amber areas, and means are provided for operatively connecting the illuminating means of the tower with speed responsive means of the associated vehicle for providing speed-synchronized color signals comparable with the markers for directly determining whether the vehicle is travelling within the speed limit designated by the markers. To this end, either the translucent body rings 21 of the tower or the light bulbs 25, or both, provide the designated color of the particular section when the light bulb thereof is illuminated. In a desirable arrangement, orange shows when the lowermost section 13 is illuminated; yellow shows when the next succeeding section 14 is illuminated; green when the section 15 is illuminated; pink when the section 16 is illuminated; blue when the section 17 is illuminated; amber when the section 18 is illuminated; amber when the section 19 is illuminated; and amber when the section 20 is illuminated.

Conveniently, illumination of the several sections of the tower 10 is effected selectively by operation of the speedometer of the vehicle, including a calibrated dial 37 and an indicator pointer 38 (FIGS. 2 and 3) and including the usual speedometer mechanism providing an oscillatable shaft 39 mounting the pointer arm. Although various means may suggest themselves for translating operation of the speedometer into operational signals for the tower 10, one means comprises utilizing the pointer arm 38 as a switch wiper arm electrically connected with the electrical power source of the vehicle such as a battery 40. Mounted intermediately along the length of the pointer 38 is a wiper contact 41 which is progressively engageable with commutator-like contact bars 13a, 14a, 15a, 16a, and 17a, in that order of sequence, and corresponding to and connected with the respective lamps 25 in the sections 13, 14, 15, 16 and 17, respectively, in the tower 10. As shown in FIG. 2, the lamps are connected electrically to the battery 40 so as to complete respective operating circuits there-through as determined by the position of the speedometer needle pointer 38 responsive to the speed of the vehicle. Where, as shown, the speedometer is calibrated for speeds up to 200 m.p.h., or any additional speed beyond the 100 mile calibration, duplication of the lamp-control circuit bars is effected, since roads permitting speeds in those higher limits will have markers numerically identifying the particular speeds and having progressive color code panels sequentially repeating the color code panels of markers in the limit zones up to the 100 m.p.h. mark.

As the pointer 38 moves progressively along each of the contact bars for the successive twenty mile speed zone gradations, respective wiper contacts 42, 43 and 44 progressively spaced from the free end of the pointer 38 move along respective sets of amber section controlling electrical bar contacts. These comprise for each twenty mile gradation a bar contact 18a which cooperates with the wiper contact 42 to illuminate the lamp 25 for the lowermost amber section 18 during the first fifteen-mile gradation of the particular color zone increment. From five to ten miles, the contact 43 is in engagement with a bar contact 19a whereby the lamp for the next higher amber tower section 19 is energized. From the ten to fifteen mile gradation, the contact 44 is in circuit-closing relation to a bar contact 20a whereby the top amber section 20 of the tower is illuminated.

During the final five mile gradation, the wiper contacts 42, 43 and 44 engage respective insulators 45, 47 and 48, whereby none of the amber sections of the tower are illuminated, showing that the vehicle is travelling at a speed within five miles of the posted limit. Thus, during the first five mile gradation of each twenty mile speed limit increment only one of the amber sections of the tower is illuminated; in the next greater gradation of five miles from five to ten, two of the amber sections are illuminated; from ten to fifteen mile gradation, three of the amber sections are illuminated; and from the fifteen mile to the top limit of each zone increment none of the amber sections are illuminated. The sequence of illumination and extinguishing of the amber sections is the same for each of the twenty mile speed limit increments. As a result, when any main color section on the tower 10 is illuminated, it will be readily apparent by how many, if any, of the amber sections are illuminated, how close to the posted limit the vehicle is travelling. For example, in the orange zone, namely up to twenty m.p.h. limit, when only one amber section is illuminated, it is readily apparent that the vehicle is travelling at no more than five m.p.h. When two of the amber zones are illuminated it is evident that the vehicle is travelling more than five m.p.h. but no more than 10 m.p.h. When three amber sections are illuminated, it is apparent that the vehicle is travelling more than 10 m.p.h. but no more than 15 m.p.h. When none of the amber sections is illuminated it is evident that the vehicle is travelling more than 15 m.p.h., but within the twenty mile speed limit evidenced by illumination of the orange section alone. As the vehicle speed increases to over twenty m.p.h., the orange section extinguishes and the yellow section 15 becomes illuminated and the progression of amber section illumination follows the same sequence as already described, and so on as the vehicle speed increases from one twenty mile increment through and beyond the next twenty m.p.h. increment and its gradations. As the speed of the vehicle decreases, just the reverse sequence of main tower color sections and amber section illumination occurs.

Preferably the one, two, three and no amber light sequence is employed at speeds up to 100 m.p.h. Over that speed the five mile sequential checkup is not as important, and therefore after 100 m.p.h., only one amber light is represented in FIGS. 1 and 2 as used, namely, the amber light of section 18, which remains illuminated for the first ten miles in each twenty mile increment, and remains extinguished in the second ten miles of the increment. For this purpose, the contact segments 18a are appropriately shortened as compared to the same segments in the speed zone sequence up to 100 m.p.h. wherein they cover the first fifteen miles of each speed zone increment. The contact arcs for the wiper contacts 43 and 44 are blanked out in the over 100 m.p.h. segments.

Suitable guide means for the pointer 38 are desirably provided to prevent vibrational displacement of the pointer-carrier contacts relative to the respective contact segments on the dial 37 and consequent flickering of the lights controlled thereby. For example, such guide means may comprise a guide shoe 49 on the pointer riding an undercut guide track 50 on the dial 37.

On some vehicles, such as trucks with wide bodies, tractors 51 pulling trailers, 52, and the like, a traffic speed verifying color tower 53 mounted in suitable location forwardly of the driver's compartment may not be visible from the rear of the vehicle. In such event, a supplementary rear-mounted device 54, which may be referred to as a color bar, is located on an upper rear portion of the vehicle, substantially as shown in FIG. 6. Both the color tower 53 and the color bar 54 are synchronized with the vehicle speed and with one another to show the several colors within twenty mile speed zone gradations and amber lights within the fractional subdivisions of the main gradations, as previously described.

While the light tower 53 may be the same as the tower 10, it may embody the modified structure depicted in FIGS. 8 and 9. In addition to a base and eight translucent vertical wall rings 55 separated by marginally stepped and flanged opaque vertical spacer partitions 57, a top compartment 58 is afforded by an inverted cup-shaped domed upper closure member 59, with the entire assembly secured together in any suitable fashion, such as by means of tie bolts 60. The compartment 58 may accommodate any additional or supplementary device as preferred. Within each of the color compartments is an electric lamp 61 which may be of an elongated style mounted in a horizontally disposed socket 62 carried by bracket 63 on the associated partition 57. Electric leads 64 for each of the respective sockets are accommodated in a columnar bundle or cable 65. Access for changing the lamps 61 individually may be afforded into the wall rings 55 by respective segmental hinged access doors 67 mounted in the circular wall sections.

In a desirable construction, the color bar 54 comprises a base plate 68 adapted to be secured in any suitable fashion, such as by means of screws extending through spaced holes 69 in longitudinal marginal flanges. To provide selectively illuminable color code sections, a partition frame is mounted on the base plate 68, comprising a median longitudinal opaque frame panel 70 in a plane normal to the plate 68, and a plurality, herein three transverse opaque partition panels 71 equidistantly spaced along the length of and in a plane normal to the base panel 68 and the longitudinal partition panel 70. This divides the area on the mounting panel 68 into eight compartments or sections, each of which is assigned a selected color, i.e., 13b orange, 14b yellow, 15b green, 16b pink, 17b blue, 18b amber, 19b amber, and 20b amber, corresponding to the color sections of the light tower 53 which are the same in number and order as in the light tower 10.

Selective illumination of each of the sections is effected by means comprising a respective electrical lamp 72 mounted in a socket 73 supported by one of the partition walls defining the particular compartment of the section. Electrical leads 74 connect the sockets in the electrical control circuit and are accommodated in a cable or bundle 75 leading to the light bar 54 from the control mechanism. Enclosing the sectional compartments is a translucent hood 77, which may be at least partially openable along a hinge 78, with suitable latching means such as clips 79 permitting the same to be swung open for access to the several lamps 72. Either the lamps 72, or the hood 77 may provide the respective sectional coloration to become brilliantly visible when the lamp of the section is illuminated in the order previously described for operation of the system in verifying the speed of the vehicle.

It is not contended that country-wide adoption of the present system would eliminate law enforcement officers, but the deterrent effect of continuous unmistable exposure of vehicle speed for all to see will, it is believed, significantly reduce the number and extend of speed violations. While no instrumentality is tamper-proof, legal penalties for tampering with operation of the color device of the speed verifying means will deter such temptations. Verification of tampering with the speed settings of the color device is readily detectable by conventional pacing. In view of the fact that many jurisdictions now have and others are rapidly moving into the legal requirements for periodic vehicle inspections for operating efficiency and accuracy of speedometer and other instruments will assure that the color devices will be maintained reasonably accurate, at least as well as speedometer accuracy is maintained.

It will be understood that variations and modifications may be effected without departing from the spirit and scope of the novel concepts of this invention.

I claim as my invention:

1. Traffic speed verifying means enabling visual determination of the speed with which a road-travelling vehicle is travelling in relation to speed limit markers located at intervals along a road and having respective color signs thereon according to a color code designating the speed limit for the associated strip of road, comprising:
   a tower device mounted on the vehicle forwardly adjacent to the position of the customary rearview mirror on the driver's side of the vehicle and within the view of observers inside and outside the vehicle;
   said device having means to provide speed-synchronized color signals comprising vertically arranged compartments with tubular translucent walls observable from all sides and comparable with the markers to enable directly determining whether the vehicle is travelling within the speed limits designated by the markers; and
   means operatively connecting said means of the device with speed responsive means of the vehicle.

2. Apparatus according to claim 1, said tower being circular in horizontal cross section.

3. Apparatus according to claim 1, each of said translucent walls comprising a tubular translucent member, and horizontal partitions comprising plates having marginal means interengaged with respective edges of the associated tubular wall members.

4. Apparatus according to claim 3, including securing bolts extending vertically through said horizontal partition plates and securing the wall members and partition plates in assembly.

5. Apparatus according to claim 1, said tower including an inverted cup-shaped domed upper closure member providing a top compartment.

6. Apparatus according to claim 1, each of said sections having in the wall thereof a hinged access door.

7. Traffic speed verifying means enabling visual determination of the speed with which a road-travelling vehicle is travelling in relation to speed limit markers located at intervals along a road and having respective color signs thereon according to a color code designating the speed limit for the associated strip of road, comprising:
   a light bar comprising a mounting base panel;
   opaque partition panels on said base panel and subdividing the area on said panel into a plurality of compartments;
   an illuminating electrical lamp in each of said compartments and having electrical connection for individual illumination; and
   a translucent hood over said compartments providing closed respective light sections corresponding to said compartments;
   each of said light sections being equipped to emanate an individual color when the lamp thereof is illuminated;
   said base panel being elongated in one direction;
   said partition panels comprising longitudinal and transverse panels extending normal to said base panel;
   certain of said partition panels having electrical lamp sockets thereon supporting said lamps in said compartments;
   said translucent hood being hingedly mounted to be opened for access to said compartments.

References Cited
UNITED STATES PATENTS

| | | | |
|---|---|---|---|
| 1,761,239 | 6/1930 | Scott | 40—132(D) |
| 2,480,290 | 8/1949 | Fein | 340—43 |
| 2,561,582 | 7/1951 | Marbel | 340—98 |
| 2,251,623 | 8/1941 | Crofoot et al. | 340—62 |
| 2,284,633 | 6/1942 | Bosch | 340—53 |
| 2,452,344 | 10/1948 | Addorisio | 340—62 |
| 3,320,586 | 5/1967 | Wagner | 340—66 |

OTHER REFERENCES

"Zone-O-Trol," Zone-O-Trol Corp. of America, Nov. 25, 1936.

THOMAS B. HABECKER, Primary Examiner

H. S. COHEN, Assistant Examiner

U.S. Cl. X.R.

340—32, 62, 87; 40—132; 116—116